United States Patent
Ratasuk et al.

(10) Patent No.: US 10,117,244 B2
(45) Date of Patent: Oct. 30, 2018

(54) UPLINK CARRIER SELECTION FOR REDUCED BANDWIDTH MACHINE TYPE COMMUNICATION DEVICES

(71) Applicant: Nokia Siemens Networks Oy, Espoo (FI)

(72) Inventors: Rapeepat Ratasuk, Hoffman Estates, IL (US); Jun Tan, Lake Zurich, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 501 days.

(21) Appl. No.: 13/780,747

(22) Filed: Feb. 28, 2013

(65) Prior Publication Data
US 2014/0241261 A1    Aug. 28, 2014

(51) Int. Cl.
H04W 72/04    (2009.01)

(52) U.S. Cl.
CPC ...... H04W 72/0453 (2013.01); *H04W 72/048* (2013.01)

(58) Field of Classification Search
None
See application file for complete search history.

(56) References Cited

U.S. PATENT DOCUMENTS

| | | | |
|---|---|---|---|
| 6,205,193 B1 * | 3/2001 | Solve et al. | 375/354 |
| 2008/0285510 A1 * | 11/2008 | Thyagarajan | H04L 5/0064 370/329 |
| 2009/0285113 A1 * | 11/2009 | Yavuz et al. | 370/252 |
| 2010/0067470 A1 * | 3/2010 | Damnjanovic et al. | 370/329 |
| 2011/0026476 A1 * | 2/2011 | Lee | H04W 74/006 370/329 |
| 2011/0280184 A1 | 11/2011 | Diachina et al. | 370/328 |
| 2011/0287765 A1 | 11/2011 | Russell et al. | 455/435.1 |
| 2011/0317654 A1 * | 12/2011 | Ishida | H04W 72/06 370/329 |
| 2012/0064935 A1 * | 3/2012 | Hakola et al. | 455/513 |
| 2012/0113831 A1 * | 5/2012 | Pelletier | H04L 5/0058 370/252 |
| 2012/0157050 A1 | 6/2012 | Kang et al. | 455/411 |
| 2012/0202508 A1 | 8/2012 | Toth et al. | 455/450 |
| 2012/0218903 A1 * | 8/2012 | Baldemair | H04L 5/001 370/242 |

(Continued)

FOREIGN PATENT DOCUMENTS

| | | |
|---|---|---|
| GB | 2493780 A | 2/2013 |
| JP | WO 2012093448 * | 7/2012 |

OTHER PUBLICATIONS

IPWireless Inc., "Backwards compatible support for reduced bandwidth MTC LTE UEs", Nov. 14-18, 2011, 3GPP TSG RAN WG1 Meeting #67, pp. 1-4.*

(Continued)

*Primary Examiner* — Steve R Young
(74) *Attorney, Agent, or Firm* — Harrington & Smith

(57) ABSTRACT

Uplink carrier selection is performed for reduced bandwidth machine type communication devices by reserving a portion of a wideband carrier for machine type communication traffic to provide a plurality of narrowband uplink carriers in the wideband carrier, and by selecting a narrowband uplink carrier of the plurality of narrowband uplink carriers for use by a machine type communication device.

32 Claims, 5 Drawing Sheets

(56) References Cited

U.S. PATENT DOCUMENTS

| | | | |
|---|---|---|---|
| 2012/0250630 A1 | 10/2012 | Paiva et al. ............... | 370/329 |
| 2013/0005387 A1 | 1/2013 | Aso et al. ................. | 455/517 |
| 2013/0010768 A1 | 1/2013 | Lee et al. .................. | 370/336 |
| 2013/0022029 A1 | 1/2013 | Ryu et al. ................. | 370/336 |
| 2013/0034071 A1* | 2/2013 | Lee ............... | H04W 74/0866 370/329 |
| 2013/0039245 A1 | 2/2013 | Jamadagni ............... | 370/311 |
| 2013/0250901 A1* | 9/2013 | Oizumi ............ | H04W 72/12 370/329 |
| 2013/0307730 A1* | 11/2013 | Fang .................. | G01S 5/14 342/464 |
| 2014/0213277 A1* | 7/2014 | Jang ................. | H04W 48/06 455/453 |
| 2016/0242117 A1* | 8/2016 | Lin ................... | H04W 52/0216 |

OTHER PUBLICATIONS

3GPP TR 36.888 V2.0.0 (Jun. 2012) 3rd Generation Partnership Project;Technical Specification Group Radio Access Network; Study on provision of low-cost MTC UEs based on LTE; (Release 11) (43 pages).

3GPP TSG RAN WG1 Meeting #67; R1-114268: San Francisco, USA. Nov. 14-18, 2011; Agenda item: 7.8; Source: IPWireless Inc.; *Backwards compatible support for reduced bandwidth MTC LTE UEs* (4 pages).

* cited by examiner

UPLINK CARRIER SELECTION FOR REDUCED BANDWIDTH MACHINE TYPE COMMUNICATION DEVICES

TECHNICAL FIELD

The exemplary and non-limiting embodiments of this invention relate generally to wireless communication systems, methods, devices and computer programs and, more specifically, to uplink carrier selection for reduced bandwidth machine type communication devices.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
AGCH access grant channel
BCCH broadcast control channel
BSC base station controller
BTS base transceiver station
CCCH common control channel
DL downlink (BS to MS)
DSL digital subscriber line
EDGE enhanced data rates for GSM evolution
eNB evolved node B
GERAN GSM EDGE radio access network
GSM global system for mobile communication
LTE long term evolution of UTRAN (E-UTRAN)
LTE-A LTE advanced
M2M machine-to-machine
MBMS multimedia broadcast multicast service
MCS modulation and coding scheme
MS mobile station
MTC machine type communications
PBCCH packet BCCH
PRACH physical random access channel, packet random access channel
RACH random access channel
SIB2 system information block type 2
TBF temporary block flow
UE user equipment
UL uplink (MS to BS)
UTRAN universal terrestrial radio access network Machine type communication (MTC) equipment refers to a category of user equipment (UE) that performs machine-to-machine (M2M) communication without user intervention or manipulation. One or more MTC devices are used to sense and collect data by detecting and measuring information. Illustrative examples of sensed data include temperatures, seismic intensities or water quantities. The detected and measured information is collected at a server (MTC server) configured to manage the MTC devices. Various services are provided to users on the basis of such information. The users receive services via the MTC server on the basis of the information reported from the MTC devices.

A communication path may be established between the MTC devices and the MTC server using a wired network, a wireless network, or any of various combinations thereof. Examples of wired networks include telephone lines, DSL (Digital Subscriber Line) and optical communication lines. Wireless networks may include any of various types of mobile phone networks. Use of a wireless network is advantageous in that it provides enhanced flexibility regarding the placement of individual MTC devices.

Typical wireless communication systems are optimized for mobile phones and such systems may be inefficient in the context of an MTC device that provides a data sensing service specific to M2M. For instance, a mobile phone is required to regularly check paging from a network side so as to receive an incoming call for voice communication addressed to the mobile phone. On the other hand, in the case of an MTC device without a voice communication function, the MTC device does not need to always remain in a ready state for receiving paging, and in fact this level of readiness is not necessary. Furthermore, MTC devices may be installed at remote locations scattered throughout a widespread area where user contact is infrequent. For this reason, the MTC devices may be designed to use a limited amount of electric power from battery cells or batteries, to thereby minimize power consumption and provide an enhanced operational life. The electric power consumed by a wireless interface used for communication should not he ignored.

Illustrative applications for MTC devices include, but are not limited to, smart metering, e-health, fleet management, bridge monitoring, object and person tracking, and theft detection, Smart meters report status information and measurements of electricity, gas, heat, water, or fuel consumption to a central station that gathers this information for billing each user. Typical features of MTC may include low mobility, large numbers of devices, small and sometimes infrequent data transmission, high reliability, time-controlled operation, and group-based communication. Some applications, such as meter reporting, are delay tolerant, whereas other applications require low latency, such as emergency services. It is expected that some service providers using MTC devices, such as electricity utilities, would require small messages to be sent on a frequent basis. This frequent messaging may be required when it is desired to control one or more grid parameters of an electrical power grid to implement a smart grid. However, existing wireless networks were designed to carry mobile phone traffic and do not expect to receive the short and 'instant' messages produced by the MTC devices. As a result, problems may arise due to the large signaling overhead that would be generated by a relatively large number of small messages.

It is expected that, over the next several years, the number of MTC devices on a typical wireless network will significantly exceed the number of mobile phones on the network. This projection implies that MTC traffic will consume a considerable amount of radio resources and may have the potential to degrade the performance of mobile phone traffic. A high volume of MTC messages will also degrade the user experience of human subscribers using web browsing and other non-real time services. If a large number of MTC devices connect to a network to receive or transmit data, congestion of the wireless network may be expected.

At present, MTC devices are supported at the physical layer using the global system for mobile communication (GSM) where inexpensive devices are widely available. With the widespread introduction of long term evolution (LTE) and the decommissioning of legacy systems, migration of MTC devices to LTE has been under investigation by many wireless network operators. One objective is to ensure that the cost of LTE-compatible MTC devices does not exceed the cost of legacy devices. Illustrative cost reduction techniques include reducing bandwidth, reducing the peak data rate, reducing the maximum transmit power. providing a single RF receiver chain, and providing half-duplex operation.

Optimization of MTC devices for use with wireless communication networks is an important issue that is currently being discussed in Release 12 of the Third Generation Partnership Project (3GPP). Pursuant to Release 12, low-cost MTC devices will likely be standardized. In the uplink (UL), these devices will be configured to support a reduced bandwidth for both RF and baseband, such as 1.4 MHz, for example. Thus, although the total system bandwidth may be, for example, 10 MHz, the MTC device is only able to use 1.4 MHz of the total bandwidth. This 1.4 MHz bandwidth is equivalent to six resource blocks.

SUMMARY

The foregoing and other problems are overcome, and other advantages are realized, by the use of the exemplary embodiments of this invention.

Pursuant to one set of exemplary embodiments of the invention, a method comprises reserving a portion of a wideband carrier for machine type communication traffic by providing a plurality of narrowband uplink carriers in the wideband carrier, and selecting a narrowband uplink carrier of the plurality of narrowband uplink carriers for use by a machine type communication device.

Pursuant to another set of exemplary embodiments of the invention, an apparatus comprises at least one processor and a memory including computer program code. The memory and computer program code are configured, with the processor, to cause the apparatus at least to reserve a portion of a wideband carrier for machine type communication traffic by providing a plurality of narrowband uplink carriers in the wideband carrier, and select a narrowband uplink carrier of the plurality of narrowband uplink carriers for use by a machine type communication device.

Pursuant to another set of exemplary embodiments of the invention, a computer program product comprises a non-transitory computer-readable medium bearing computer program code embodied therein for use with a computer, wherein execution of the computer program code comprises reserving a portion of a wideband carrier for machine type communication traffic by providing a plurality of narrowband uplink carriers in the wideband carrier, and selecting a narrowband uplink carrier of the plurality of narrowband uplink carriers for use by a machine type communication device.

Pursuant to another set of exemplary embodiments of the invention, a non-transitory computer-readable medium contains software program instructions, wherein execution of the software program instructions by at least one data processor results in performance of operations that comprise reserving a portion of a wideband carrier for machine type communication traffic by providing a plurality of narrowband uplink carriers in the wideband carrier, and selecting a narrowband uplink carrier of the plurality of narrow band uplink carriers for use by a machine type communication device.

BRIEF DESCRIPTION OF THE DRAWINGS

The foregoing and other aspects of exemplary embodiments of this invention are made more evident in the following Detailed Description, when read in conjunction with the attached Drawings, wherein.

DETAILED DESCRIPTION

Figure 1:
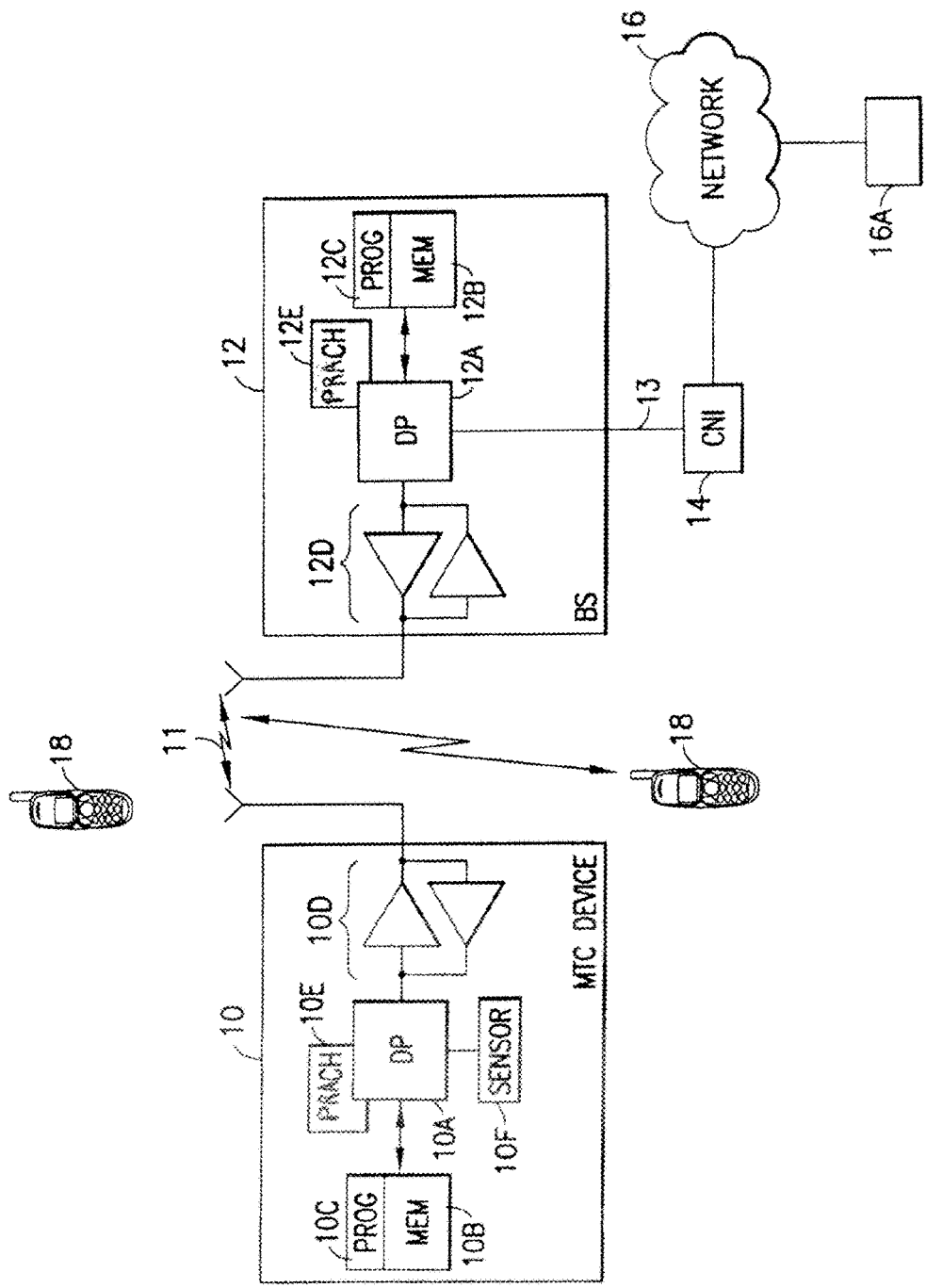
FIG. 1 illustrates a simplified block diagram of various exemplary electronic devices and apparatuses that are suitable for use in practicing the exemplary embodiments of this invention.

FIG. 1 illustrates a simplified block diagram of various electronic devices and apparatus that are suitable for use in practicing the exemplary embodiments of this invention. A wireless network 1 is configured for communication over a wireless link 11 with an apparatus, such as a machine type communication (MTC) device 10, via a network access node, such as a base station (BS) 12. Depending on the type of wireless network that is employed, the BS 12 may be referred to as a base transceiver station (BTS), a Node B, or as an evolved Node B (eNB). The network 1 includes a core network infrastructure (CNI) 14, such as one or more gateways and one or more mobility management entities, that provide connectivity with a further network, such as a telephone network and/or a packet-based, internet protocol (IP) data communications network (e.g., the Internet). The MTC device 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the BS 12 via one or more antennas.

The BS 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The BS 12 is coupled via a data/control path 13 to the CNI 14.

Pursuant to a set of exemplary embodiments of the invention, the MTC device 10 can include one or more sensors 10F such as, but not limited to, electrical current sensors, fluid flow sensors and or temperature humidity sensors. The data processor 10A is configured to read the sensor 10F and report the reading to a desired destination 16A via, for example, the transceiver 10D, the wireless link 11, the BS 12, and the Internet 16. The destination 16A may be, for example, a utility company or, more generally, any consumer of the sensor readings made by the MTC device 10. The MTC device may include a physical random access channel (PRACH) functional unit or module 10E. The BS 12 includes a complementary PRACH functional unit or module 12E.

For purposes of illustration, the BS 12 may be assumed to establish at least one cell within which the MTC device 10 is located. Within the cell at any given time there can be a number of MTC devices 10, as well as a number of conventional mobile communication devices 18. The devices 18 may be, for example, mobile stations, user equipments (UEs), mobile terminals, cellular phones, smart phones, computing devices including PDAs and tablet-based computing devices, gaming devices or, in general, any type of conventional user devices that employ wireless cellular connectivity. The mobile communication devices 18 are capable of establishing and maintaining voice and/or data calls and connections through the BS 12 using conventional cellular transmission and reception protocols. The mobile communication devices 18 share radio spectrum and radio resources with the MTC devices 10. One exemplary objective of the embodiments of this invention is to minimize the impact of the MTC device(s) 10 on the radio spectrum and radio resources that are also used by the mobile communication devices 18.

The programs 10C and 12C may include program instructions that, when executed by the associated data processor DP (10A 12A, respectively), enable the MTC device 10 and the BS 12 to operate in accordance with the exemplary embodiments of this invention, as will be discussed below in greater detail. The exemplary embodiments of this invention may be implemented at least in part by computer software executable by the DP 10A of the MTC device 10 and by the DP 12A of the BS12, or by dedicated hardware, or by a combination of software and hardware (and firmware).

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

It should be noted that the MTC device 10 may, in certain alternate embodiments or in certain use situations, be implemented using one of the mobile communication devices 18. In these alternate embodiments, the mobile communication devices would transmit data messages of limited size.

Figure 2:
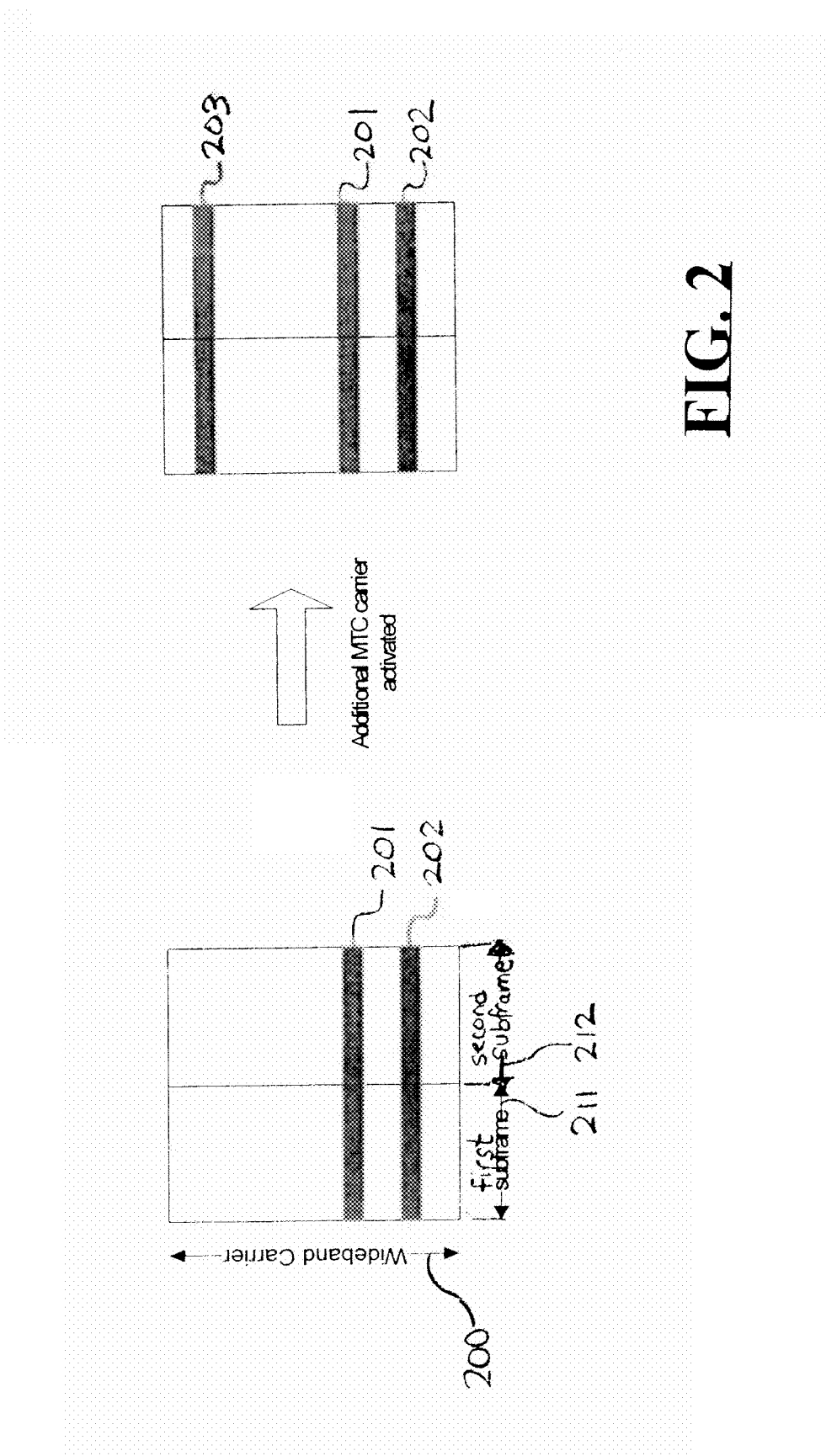
FIG. 2 is a data structure diagram showing a plurality of narrowband uplink carriers within a wideband carrier according to a set of exemplary embodiments of this invention.

FIG. 2 is a data structure diagram showing a plurality of narrowband uplink carriers within a wideband carrier 200 according to a set of exemplary embodiments of this invention. Each of the narrowband uplink carriers has a bandwidth that is narrower than the bandwidth of the wideband carrier 200. A portion of system bandwidth is reserved for MTC traffic by provisioning a first uplink MTC carrier 201 as well as a second uplink MTC carrier 202 in both a first subframe 211 and a second subframe 212 of the wideband carrier 200. Over time, the quantity of uplink MTC carriers may be adjusted in accordance with actual, expected, predicted, or estimated MTC traffic conditions. For example, as traffic from MTC devices such as MTC device 10 (FIG. 1) increases, more narrowband carriers may be added to the wideband carrier 200 (FIG. 2), such as a third uplink MTC carrier 203. Another example is that the number of MTC devices 10 (FIG. 1) may increase, and thus more narrowband carriers may be added to the wideband carrier 200 (FIG. 2). It is also possible to decrease the quantity of MTC carriers in the event that MTC traffic decreases or is expected to decrease, or in the event that the number of deployed MTC devices decreases.

From time to time, non-MTC UEs may be assigned to one or more of the uplink MTC carriers 201, 202, 203. These non-MTC UEs may comprise, for example, conventional mobile phones or smartphones. This assignment could, but need not, be based upon scheduler decisions. However, low-cost MTC devices are only permitted to select and utilize a single uplink MTC carrier. such as the first uplink MTC carrier 201, at any given time.

Figure 3:
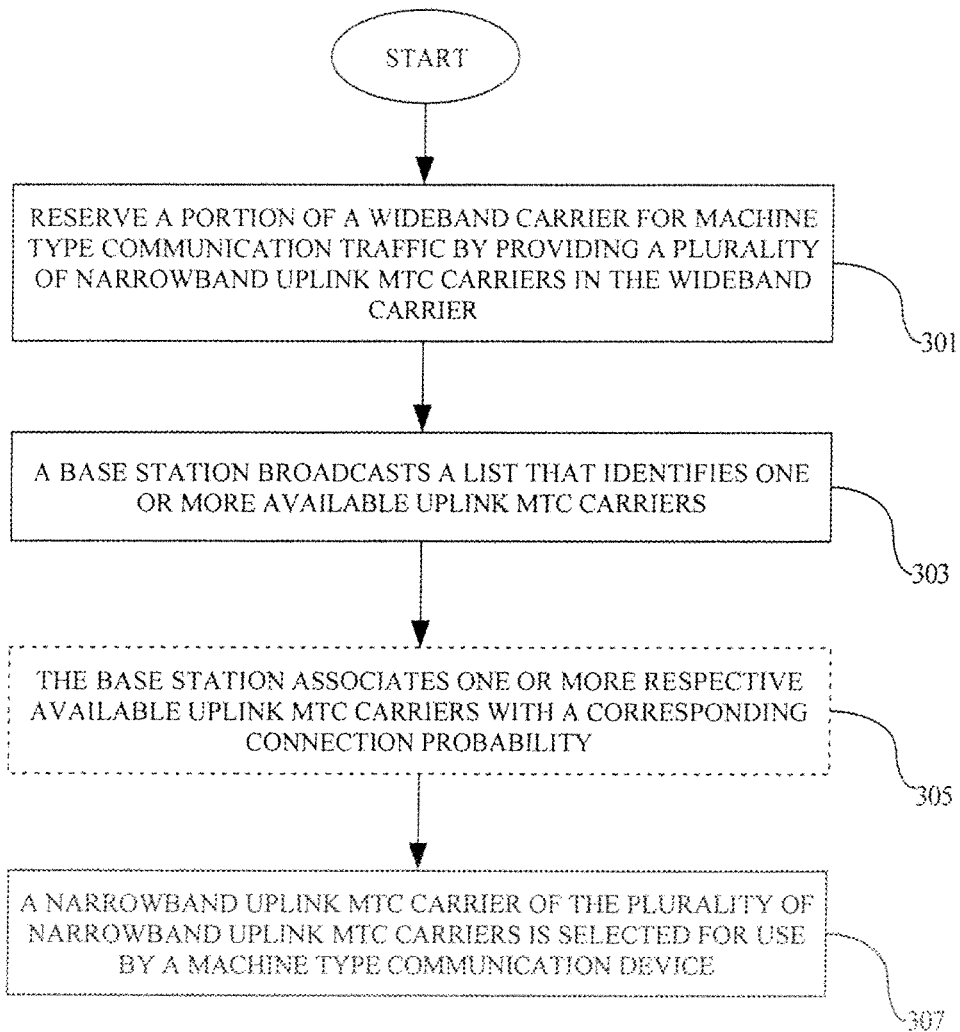
FIG. 3 is a logic flow diagram that illustrates the operation of an exemplary method, and a result of execution of computer program instructions embodied on a computer readable medium, in accordance with a first set of exemplary embodiments of this invention.

FIG. 3 is a logic flow diagram that illustrates the operation of an exemplary method, and a result of execution of computer program instructions embodied on a computer readable medium, in accordance with a first set of exemplary embodiments of this invention. The operational sequence of FIG. 3 commences at block 301 where a portion of the wideband carrier 200 (FIG. 2) is reserved for machine type communication traffic by providing, pursuant to an illustrative example, a plurality of narrowband uplink MTC carriers 201, 202, 203 in the wideband carrier 200. Next, at block 303 (FIG. 3), abase station such as BS 12 (FIG. 1) broadcasts a list that identifies one or more available uplink MTC carriers, such as any of the first, second, or third uplink MTC carriers 201, 202, 203 of FIG. 2. This list may, but need not, be provided by augmenting a system information block (SIB) as, for example, a type 2 system information block (SIB2), to carry an ulMTCCarrier field listing all available uplink MTC carriers. The SIB2 is an information block that carries relevant information about common and shared channels in LTE and LTE-A.

At optional block 305 (FIG. 3), the BS 12 (FIG. 1) associates one or more respective available uplink MTC carriers with a corresponding connection probability. The corresponding connection probabilities may, but need not, be provided in a ulMTCCarrierConProb field that is associated with the ulMTCCarrier field. The connection probability is the probability that a UE such as the MTC device 10 (FIG. 1) will connect to a particular uplink MTC carrier, An illustrative example of a ulMTCCarrier field is {1850, 1855, 1890} denoting the available uplink MTC carriers in MHz where 1850 MHz may represent, for instance. the first uplink MTC carrier 201 (FIG. 2). Of course, the uplink carriers could, but need not, be identified using GHz instead of MHz. An illustrative example of a ulMTCCarrierConProb field is {0.5. 0.3, 0.2}. This ulMTCCarrierConProb field indicates that the probability of connecting to the ulMTC-Carrier 1850 is 50%.

The operational sequence of FIG. 3 progresses to block 307 where a narrowband uplink MTC carrier of the plurality of narrowband uplink MTC carriers is selected for use by a machine type communication device. This selection may, but need not, be performed by using the connection probabilities that are provided in the ulMTCCarrierConProb field. For example, the narrowband uplink MTC carrier having the highest connection probability may be selected. However, since block 305 is optional, the UE, such as MTC device 10 (FIG. 1), will select an uplink MTC carrier at random if the ulMTCCarrierConProb field is not used.

Pursuant to another set of embodiments of the invention. the ulMTCCarrierConProb of block 305 may be divided into multiple groups based on service or MTC device characteristics. For example, one or more of the following groups may be provided, including a ulMTCCarrierConProb1 for devices with emergency or high-priority data transmission, a ulMTCCarrierConProb2 for devices with timed access, a ulMTCCarrierConProb3 for low-data rate devices, and a ulMTCCarrierConProb4 for devices in poor coverage areas. Poor coverage may be determined with reference to path loss exceeding a specified threshold. Each ulMTCCarrierConProb group will have its own connection probability, including "not allowed to connect". The "not allowed to connect" may be denoted by a probability value of 0.0. Use of one or more of the aforementioned groups will allow the network to provide appropriate resource configuration and prioritization on the different carriers.

Pursuant to another set of embodiments of the invention, the UE (such as MTC device 10, FIG. 1) may combine the ulMTCCarrierConProb received from the network with its own selection priority in order to determine the overall connection probability. For example, based on past access, the UE may determine that a certain carrier is preferred, and may therefore combine this information with the ulMTC-CarrierConProb provided by the network in its selection procedure. For example, if ulMTCCarrierConProb={0.8. 0.2} but the UE's own selection preference is {0.34, 0.66}, then the combined connection probability can be determined as {0.75, 0.25}.

Pursuant to yet another set of embodiments of the invention, the BS 12 (FIG. 1) may provide a mapping between a ulMTCCarrierConProb group and MTC service or device characteristics at block 305 of FIG. 3.

Pursuant to yet another set of embodiments of the invention, the BS 12 (FIG. 1) may provide a field indicating whether non-MTC devices can access the system via the narrowband uplink MTC carriers (i.e. by performing random access procedure on an uplink MTC carrier). This may include information regarding reserved preamble indices to be used by non-MTC devices or specific physical random access channel (PRACH) access opportunities (e.g. non-MTC devices are restricted to a specific PRACH subframe).

Pursuant to yet another set of embodiments of the invention, the BS 12 (FIG. 1) may provide a field indicating whether MTC devices can access the system via the wideband carrier 200 (FIG. 2) (i.e. by performing random access procedure on a wideband carrier). This may include information regarding reserved preamble indices to be used by MTC devices or specific PRACH access opportunities (e.g. MTC devices are restricted to a specific PRACH subframe).

Pursuant to yet another set of embodiments of the invention, the BS 12 (FIG. 1) may use any of the methods described hereinafter with reference to FIG. 4 to determine the connection probability for each uplink channel.

Figure 4:
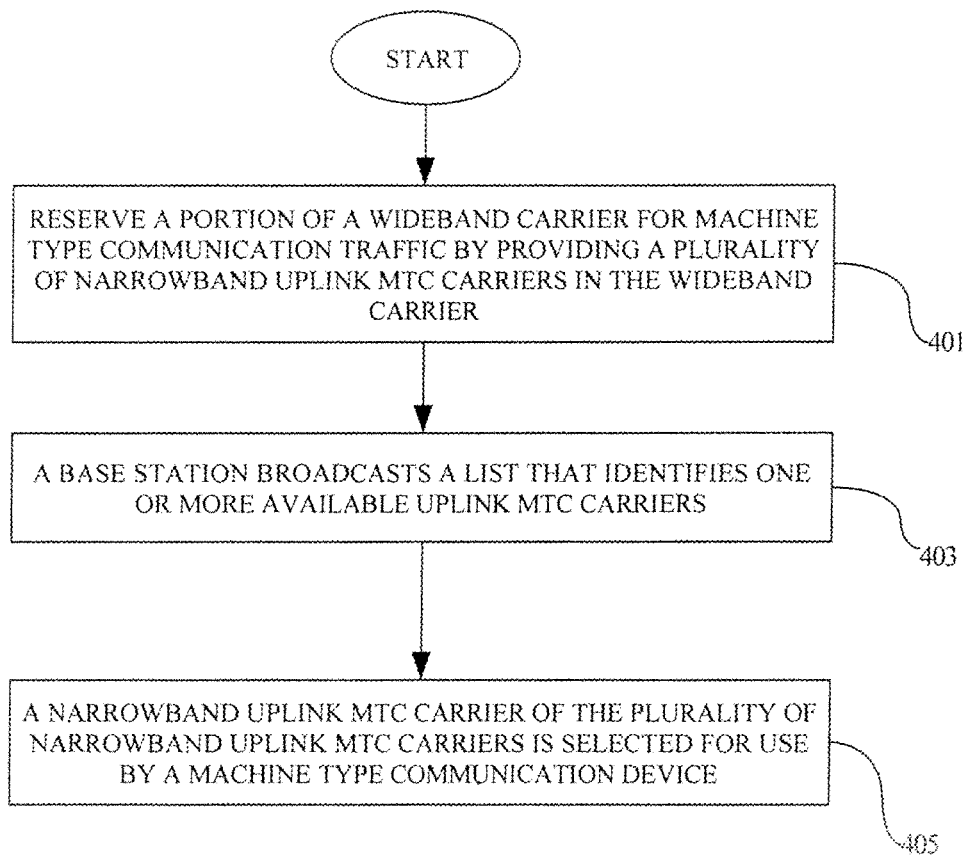
FIG. 4 is a logic flow diagram that illustrates the operation of an exemplary method, and a result of execution of computer program instructions embodied on a computer readable medium, in accordance with a second set of exemplary embodiments of this invention.

FIG. 4 is a logic flow diagram that illustrates the operation of an exemplary method, and a result of execution of computer program instructions embodied on a computer readable medium, in accordance with a second set of exemplar embodiments of this invention, The operational sequence of FIG. 4 commences at block 401 where a portion of the wideband carrier 200 (FIG. 2) is reserved for machine type communication traffic by providing, pursuant to an illustrative example, a plurality of narrowband uplink MTC carriers 201, 202, 203 in the wideband carrier 200. Next, at block 403 (FIG. 4), a base station such as BS 12 (FIG. 1) broadcasts a list that identifies one or more available uplink MTC carriers, such as any of the first, second, or third uplink MTC carriers 201, 202, 203 of FIG. 2. This list may, but need not, be provided by augmenting a system information block type 2 (SIB2) to carry an ulMTCCarrier field listing all available uplink MTC carriers. The SIB2 is an information block that carries relevant information about common and shared channels in LTE and LTE-A.

The operational sequence of FIG. 4 progresses to block 405 where a narrowband uplink MTC carrier of the plurality of narrowband uplink MTC carriers is selected for use by a machine type communication device. It is assumed that the network broadcasts MTC-related parameters (ulMTCCarrier, PRACH parameters, etc.) but does not give guidance on which narrowband uplink MTC carrier to select. In this case, the ulMTCCarrierConProb field is not available.

Pursuant to one set of embodiments, the UE, such as MTC device 10 (FIG. 1), attempts access on all or a plurality of available uplink carriers using a random access channel (RACH) procedure with the PRACH module 12E (FIG. 1) if the RACH is not overlapping in time. Based on the random access response message from the BS 12 (FIG. 1), the UE selects the channel with the highest modulation and coding scheme (MCS) value given in the random access response message. The key to this method is that the BS 12 may estimate the channel response and received signal and interference to noise ratio (SINR) from the RACH preamble and will response by assigning the MCS accordingly. Since a significant number of low-cost MTC UEs may not move or have limited mobility, the short-term MCS value can be used to indicate long-term performance. Therefore, the UE is likely to select the better uplink carrier based on the MCS given in the random access response message.

Pursuant to another set of embodiments, the UE, such as MTC device 10 (FIG. 1), selects uplink carrier based on a probabilistic model using past performance or history of carrier access. For example, the UE may keep a weighted score for each of the carriers based on the average assigned MCS or SINR as—

$$s_i = \sum_i e^{-ck} w_i MCS_{k,i}$$

where $s_i$ is the score for carrier i, $\alpha$ is the decaying factor, $w_i$ is the carrier-specific weighting, and $MCS_{k,i}$ is the average MCS level for carrier i at the k-th access. The UE determines the probability of selecting a given carrier based on $$p_i = \frac{s_i}{\sum_i s_i}$$

The key to this method is that the BS 12 (FIG. 1) may take into account past performance when a particular carrier was selected. Since a significant number of low-cost MTC devices 10 may not move or have limited mobility, past performance can be a good predictor of future performance. Initially the carrier selection is random for the MTC device 10. Overtime the selection will be improved with this approach.

Pursuant to yet another set of embodiments, the UE, such as the MTC device 10 (FIG. 1) selects an uplink MTC carrier based on SINR, signal strength (e.g. RSRP), or signal quality (e.g. RSRQ) of the downlink reference signal. This is for system with channel reciprocity (TDD) where uplink and downlink carriers share the same frequency.

Pursuant to yet another set of embodiments, the UE, such as the MTC device 10 (FIG. 1) selects uplink carrier based on PRACH latency, carrier preference, and data priority. In this case, the UE may have determined carrier preference based on the method described above. This carrier preference may be further refined using PRACH latency (e.g. time to next random access opportunity) and data priority (e.g. emergency or regular reporting).

Figure 5:
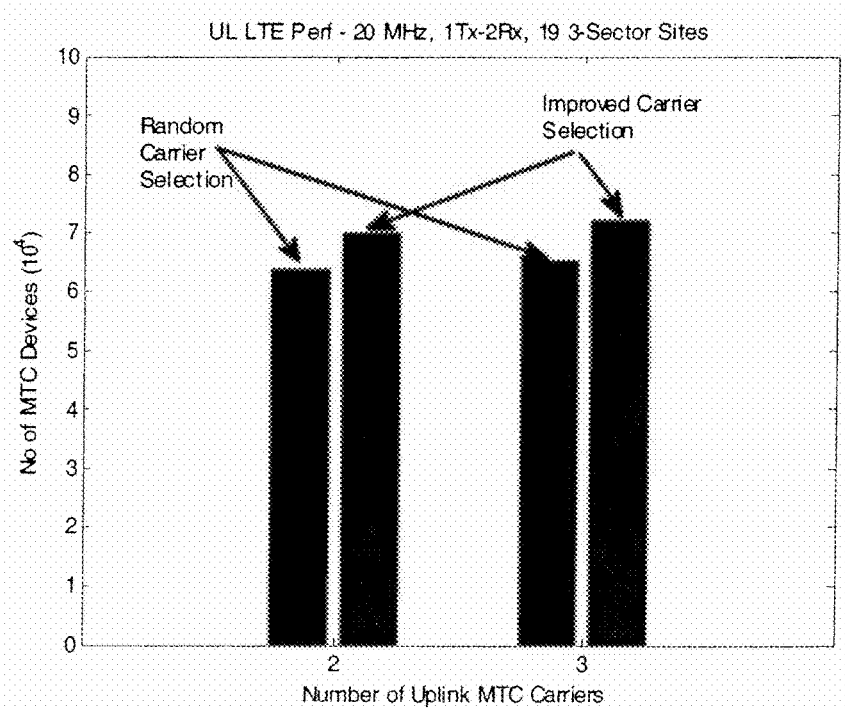
FIG. 5 is a bar graph showing an illustrative improvement in data throughout using any of the methods described with reference to FIG. 4.

FIG. 5 is a bar graph showing an illustrative improvement in data throughout and performance gain using any of the methods described with reference to FIG. 4 wherein the MTC device attempts to select the better uplink channel. The bar graph of FIG. 5 was prepared using an illustrative scenario of smart meter deployment in an Advanced Metering Infrastructure network. The meters are stationary and therefore the channel is static. In the uplink, the smart meter is assumed to transmit 2017 bytes of data at a rate of $1.1\ e^{-4}$ per meter per second. Thus, the device accesses the carrier every 9090 seconds and carrier selection is assumed at every attempt. From FIG. 5, it can be seen that, with 2 uplink MTC carriers, 9% gain can be had using any of the procedures of FIG. 4 as compared to random selection of the uplink carrier. With 3 uplink MTC carriers, the gain is 12%.

Based on the foregoing it should be apparent that the exemplary embodiments of this invention provide a method, apparatus and computer program(s) to perform uplink carrier selection for reduced bandwidth machine type communication devices. The various blocks shown in FIGS. 3 and 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device. although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples. hardware, software, firmware, special purpose circuits or logic, general purpose hardware or controller or other computing devices, or some combination thereof.

It should thus be appreciated that a east some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE and LTE-A systems, it should be appreciated that the exemplary embodiments of this invention are not limited for use with only these particular types of wireless communication systems, and that they may be used to advantage in other wireless communication systems.

It should be noted that the terms "connected," "coupled," or any variant thereof mean any connection or coupling, either direct or indirect, between two or more elements, and may encompass the presence of one or more intermediate elements between two elements that are "connected" or "coupled" together. The coupling or connection between the elements can be physical, logical, or a combination thereof, As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different channels are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

receiving, by a machine type communication device:
   an indication of a plurality of narrowband uplink carriers in a wideband carrier, reserved for machine type communication traffic, and
   at least one group of connection probabilities from among a plurality of groups of connection probabilities corresponding to the plurality of narrowband uplink carriers, wherein each of the connection probabilities in the at least one group is indicative of a probability that the machine type communication device will connect to a respective one of the plurality of narrowband uplink carriers, wherein the plurality of groups of connection probabilities are divided based on at least one of: a machine type communication device characteristic and a machine type communication service characteristic;

storing selection priority information in the machine type communication device;

selecting a narrowband uplink carrier from among the plurality of narrowband uplink carriers for use by the machine type communication device based at least on a combination of stored selection priority information and the at least one group of corresponding connection probabilities; and transmitting machine type communication traffic on the selected narrowband uplink carrier from the machine type communication device to a network, wherein the plurality of groups of connection probabilities comprise at least two of: a group of connection probabilities for devices with emergency and/or high-priority data transmission; a group of connection probabilities for devices with timed-access; a group of connection probabilities for low-data rate devices; and a group of connection probabilities for devices in poor coverage areas.

2. The method of claim 1 further comprising attempting access on the plurality of narrowband uplink carriers using a random access channel procedure by the machine type communication device.

3. The method of claim 1 wherein the corresponding connection probabilities are based upon a probabilistic model using a past performance history of narrowband uplink carrier access.

4. The method of claim 1 wherein the selecting is performed based upon one or more of the signal to interference and noise ratio of a received downlink signal, the signal strength of the received downlink signal, or the signal quality of the received downlink signal.

5. The method of claim 1 wherein the selecting is performed based upon one or more of latency of a physical random access channel, carrier preference, and data priority.

6. The method of claim 1 wherein the indication of the plurality of narrowband uplink carriers is a list broadcasted in a type 2 system information block (SIB2).

7. The method of claim 1, wherein the stored selection priority information in the machine type communication device is based on past access of the machine type communication device with at least one of the plurality of carriers.

8. The method of claim 2, further comprising receiving a random access response message, and wherein the selecting comprises selecting the narrowband uplink carrier with the highest modulation and coding scheme (MCS) value given in the random access response message.

9. The method of claim 1, wherein the selecting is performed based upon latency of a physical random access channel.

10. The method of claim 1, wherein the selecting is performed based upon data priority.

11. The method of claim 1, wherein the plurality of groups of connection probabilities are divided based on the machine type communication service characteristic.

12. The method of claim 1, wherein the plurality of groups of connection probabilities are divided based on the machine type communication device characteristic.

13. An apparatus comprising at least one processor and a memory including computer program code, the memory and computer program code being configured, with the processor, to cause the apparatus at least to:
receive, by a machine type communication device comprising the apparatus:
an indication of a plurality of narrowband uplink carriers in a wideband carrier, reserved for machine type communication traffic, and
at least one group of connection probabilities from among a plurality of groups of connection probabilities corresponding to the plurality of narrowband uplink carriers, wherein each of the connection probabilities in the at least one group is indicative of a probability that a machine type communication device will connect to a respective one of the plurality of narrowband uplink carriers, wherein the plurality of groups of connection probabilities are divided based on at least one of: a machine type communication service characteristic and a machine type communication device characteristic;
store selection priority information in the machine type communication device;
select a narrowband uplink carrier from among the plurality of narrowband uplink carriers for use by the machine type communication device based at least on a combination of the stored selection priority information and the at least one group of corresponding connection probabilities, and
transmit machine type communication traffic on the selected narrowband uplink carrier from the machine type communication device to a network,
wherein the plurality of groups of connection probabilities comprise at least two of: a group of connection probabilities for devices with emergency and/or high-priority data transmission; a group of connection probabilities for devices with timed access; a group of connection probabilities for low-data rate devices; and a group of connection probabilities for devices in poor coverage areas.

14. The apparatus of claim 13 wherein the at least one processor and the memory including computer program code are further configured to attempt access on the plurality of narrowband uplink carriers using a random access channel procedure.

15. The apparatus of claim 13 wherein the corresponding connection probabilities are based upon a probabilistic model using a past performance history of narrowband uplink carrier access.

16. The apparatus of claim 13 wherein the selecting is performed based upon one or more of the signal to interference and noise ratio of a received downlink signal, the signal strength of the received downlink signal, or the signal quality of the received downlink signal.

17. The apparatus of claim 13 wherein the selecting is performed based upon one or more of latency of a physical random access channel, carrier preference, and data priority.

18. The apparatus of claim 13 wherein the indication of the plurality of narrowband uplink carriers is a list broadcasted in a type 2 system information block (SIB2).

19. The apparatus of claim 13, wherein the stored selection priority information in the machine type communication device is based on past access of the machine type communication device with at least one of the plurality of carriers, wherein the at least one processor and the memory including computer program code are further configured to receive a random access response message, and wherein the selecting comprises selecting the narrowband uplink carrier with the highest modulation and coding scheme (MCS) value given in the random access response message.

20. The apparatus of claim 13, wherein the plurality of groups of connection probabilities are divided based on the machine type communication service characteristic.

21. The apparatus of claim 13, wherein the plurality of groups of connection probabilities are divided based on the machine type communication device characteristic.

22. A computer program product comprising a non-transitory computer-readable medium bearing computer program code embodied therein for use with a computer, wherein execution of the computer program code comprises:
receiving, by a machine type communication device:
an indication of a plurality of narrowband uplink carriers in a wideband carrier, reserved for machine type communication traffic, and
at least one group of connection probabilities from among a plurality of groups of connection probabilities corresponding to the plurality of narrowband uplink carriers, wherein each of the connection probabilities in the at least one group is indicative of a probability that the machine type communication device will connect to a respective one of the plurality of narrowband uplink carriers, wherein the plurality of groups of connection probabilities are divided based on at least one of: a machine type communication service characteristic and a machine type communication device characteristic;

storing selection priority information in the machine type communication device;

selecting a narrowband uplink carrier from among the plurality of narrowband uplink carriers for use by the machine type communication device based at least on a combination of stored selection priority information and the at least one group of corresponding connection probabilities, and transmitting machine type communication traffic on the selected narrowband uplink carrier from the machine type communication device to a network, wherein the plurality of groups of connection probabilities comprise at least two of; a group of connection probabilities for devices with emergency and/or high-priority data transmission; a group of connection probabilities for devices with timed-access; a group of connection probabilities for low-data rate devices; and a group of connection probabilities for devices in poor coverage areas.

23. The computer program product of claim 22 further comprising computer program code for attempting access on the plurality of narrowband uplink carriers using a random access channel procedure by the machine type communication device.

24. The computer program product of claim 22 wherein the corresponding connection probabilities are based upon a probabilistic model using a past performance history of narrowband uplink carrier access.

25. The computer program product of claim 22 wherein the selecting is performed based upon one or more of the signal to interference and noise ratio of a received downlink signal, the signal strength of the received downlink signal, or the signal quality of the received downlink signal.

26. The computer program product of claim 22 wherein the selecting is performed based upon one or more of latency of a physical random access channel, carrier preference, and data priority.

27. The computer program product of claim 22 wherein the indication of the plurality of narrowband uplink carriers is a list broadcasted in a type 2 system information block (S1B2).

28. The computer program product of claim 22, wherein the stored selection priority information in the machine type communication device is based on past access of the machine type communication device with at least one of the plurality of carriers, wherein the execution of the computer program code further comprises receiving a random access response message, and wherein the selecting comprises selecting the narrowband uplink carrier with the highest modulation and coding scheme (MCS) value given in the random access response message.

29. An apparatus comprising at least one processor and a memory including computer program code, the memory and computer program code being configured, with the processor, to cause the apparatus at least to:

reserve, by a network, a portion of a wideband carrier for machine type communication traffic by providing a plurality of narrowband uplink carriers in the wideband carrier, associate one or more respective available narrowband uplink carriers of the plurality of narrowband uplink carriers with a corresponding connection probability to form a plurality of groups of connection probabilities, wherein the groups of connection probabilities are divided based on at least one of: a machine type communication service characteristic and a machine type communication device characteristic, and wherein each connection probability in each of the groups is indicative of a probability that a machine type communication device will connect to an available narrowband uplink carrier of the one or more respective available narrowband uplink carriers, broadcast an indication identifying the plurality of narrowband uplink carriers and one of the groups of corresponding connection probabilities, and receive machine type communication traffic on a selected narrowband uplink carrier from the machine type communication device according to at least a combination of the broadcasted group of connection probabilities and selection priority information stored on the machine type communication device, wherein the plurality of groups of connection probabilities comprise at least two of: a group of connection probabilities for devices with emergency and/or high-priority data transmission; a group of connection probabilities for devices with timed-access; a group of connection probabilities for low-data rate devices; and a group of connection probabilities for devices in poor coverage areas.

30. The apparatus of claim 29 wherein the corresponding connection probability is based upon a probabilistic model using a past performance history of narrowband uplink carrier access.

31. The apparatus of claim 29, wherein the machine type communication traffic is received from the machine type communication device based upon one or more of the signal to interference and noise ratio of a received downlink signal, the signal strength of the received downlink signal, or the signal quality of the received downlink signal.

32. The apparatus of claim 29 wherein the indication of the plurality of narrowband uplink carriers is a list broadcasted in a type 2 system information block (SIB2).

\* \* \* \* \*

UNITED STATES PATENT AND TRADEMARK OFFICE
CERTIFICATE OF CORRECTION

PATENT NO. : 10,117,244 B2
APPLICATION NO. : 13/780747
DATED : October 30, 2018
INVENTOR(S) : Rapeepat Ratasuk and Jun Tan Page 1 of 1

It is certified that error appears in the above-identified patent and that said Letters Patent is hereby corrected as shown below:

In the Claims

In Claim 27:
Column 13, Line 47, "S1B2" should be deleted and --SIB2-- should be inserted.

Signed and Sealed this
Eleventh Day of December, 2018

Andrei Iancu
*Director of the United States Patent and Trademark Office*